(12) United States Patent
Hoyer et al.

(10) Patent No.: US 10,826,707 B2
(45) Date of Patent: Nov. 3, 2020

(54) PRIVACY PRESERVING TAG

(71) Applicant: ASSA ABLOY AB, Stockholm (SE)

(72) Inventors: Philip Hoyer, Richmond (GB); Mark Robinton, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 239 days.

(21) Appl. No.: 15/784,627

(22) Filed: Oct. 16, 2017

(65) Prior Publication Data

US 2019/0116046 A1 Apr. 18, 2019

(51) Int. Cl.
| | | |
|---|---|---|
| *H04L 29/06* | (2006.01) | |
| *H04L 9/32* | (2006.01) | |
| *H04L 9/14* | (2006.01) | |
| *H04L 9/08* | (2006.01) | |
| *H04L 9/06* | (2006.01) | |
| *H04W 12/02* | (2009.01) | |
| *H04W 4/80* | (2018.01) | |

(52) U.S. Cl.
CPC .......... *H04L 9/3242* (2013.01); *H04L 9/0643* (2013.01); *H04L 9/0869* (2013.01); *H04L 9/0894* (2013.01); *H04L 9/14* (2013.01); *H04L 9/3228* (2013.01); *H04L 63/0428* (2013.01); *H04W 4/80* (2018.02); *H04W 12/02* (2013.01)

(58) Field of Classification Search
CPC ....... H04L 9/3242; H04L 9/14; H04L 9/0869; H04L 9/3228; H04L 9/0894; H04L 9/0643
See application file for complete search history.

(56) References Cited

U.S. PATENT DOCUMENTS

| | | | | |
|---|---|---|---|---|
| 2004/0073796 | A1* | 4/2004 | Kang | H04W 12/0013 713/171 |
| 2007/0276765 | A1* | 11/2007 | Hazel | G06K 7/082 705/71 |
| 2008/0163361 | A1* | 7/2008 | Davis | G06F 21/31 726/19 |
| 2014/0145823 | A1* | 5/2014 | Aase | G07C 9/00309 340/5.61 |

(Continued)

FOREIGN PATENT DOCUMENTS

| | | |
|---|---|---|
| EP | 2487629 | 8/2012 |
| WO | 2014140807 | 9/2014 |

(Continued)

OTHER PUBLICATIONS

"International Application Serial No. PCT IB2018 001279, International Search Report dated Feb. 11, 2019", 3 pgs.

(Continued)

*Primary Examiner* — Harunur Rashid
(74) *Attorney, Agent, or Firm* — Schwegman Lundberg & Woessner, P.A.

(57) ABSTRACT

A privacy preserving tag and methods for reading the same are disclosed. An authentication and tracking method and system for the privacy preserving tag is also disclosed. The method includes storing information in memory of a tag, receiving a read response at the tag from a reading device, and responding to the read request by generating a response at the tag that includes a combination of a base resource identifier as well as a privacy identifier. The privacy identifier is provided to support privacy characteristics of the tag while enabling establishment of a personalized portal at a remote system.

20 Claims, 8 Drawing Sheets

(56) References Cited

U.S. PATENT DOCUMENTS

2017/0017947 A1\* 1/2017 Robinton ............ G06Q 20/3278

FOREIGN PATENT DOCUMENTS

| WO | 2014195313 | 12/2014 |
| WO | 2019077406 | 4/2019 |

OTHER PUBLICATIONS

"International Application Serial No. PCT IB2018 001279, Written Opinion dated Feb. 11, 2019", 7 pgs.
"International Application Serial No. PCT IB2018 001279, International Search Report dated Feb. 26, 2019", 4 pgs.
"International Application Serial No. PCT IB2018 001279, Written Opinion dated Feb. 26, 2019", 7 pgs.

\* cited by examiner

PRIVACY PRESERVING TAG

FIELD OF THE DISCLOSURE

The present disclosure is generally directed toward personalized electronic tags that are simultaneously capable of supporting privacy features.

BACKGROUND

One type of identification technology employs Near Field Communications (NFC). NFC is a set of short-range wireless communication technologies that have devices operate at approximately 13.56 MHz and at rates ranging from 106 kbit/s to 848 kbit/s. NFC standards cover communications protocols and data exchange formats, and are based on existing radio-frequency identification (RFID) standards including ISO/IEC 14443 and FeliCa, each of which are hereby incorporated herein by reference in their entirety. The standards include ISO/IEC 18092, which is also incorporated herein by reference in its entirety, and those defined by the NFC Forum.

Another type of technology emerging as a viable alternative to NFC is various versions of the Bluetooth standard (e.g., Bluetooth 4, Bluetooth Low Energy (BLE), etc.), the entire contents of which are hereby incorporated herein by reference. Bluetooth is a wireless technology standard for exchanging data over short distances (using short-wavelength radio transmissions in the ISM band from 2400-2480 MHz) from fixed and mobile devices, creating personal area networks (PANs) with high levels of security. The primary difference between NFC technologies and Bluetooth technologies is that Bluetooth relies on powered devices for both sides of the communication whereas NFC facilitates communications between a powered device and a passive device (e.g., an NFC tag or credential). In other words, under NFC standards, one device can operate without an internal power source, such as a battery.

There are currently three NFC operating modes defined by the NFC Forum: (1) Card Emulation Mode; (2) Reader/Writer Mode; and (3) Peer-to-Peer Mode. In the Card Emulation Mode, an NFC-enabled phone emulates a contactless card in accordance with ISO 14443 and/or ISO 15693, each of which are hereby incorporated herein by reference in their entirety. Typical applications of the Card Emulation Mode include payment, ticketing, and access control applications.

In the Reader/Writer Mode, the NFC-enabled phone reads a tag and typically performs some function based on the information obtained from the read tag. Typical applications of the Reader/Writer Mode include reading posters with an NFC tag in proximity thereto, interactive advertising, launching mobile Internet (e.g., automated web-browser activation), automated Short Message Service (SMS), and automated call initiation.

In the Peer-to-Peer Mode, two NFC-enabled phones, or similar types of devices, are allowed to exchange data with one another. Typical applications of the Peer-to-Peer Mode include setting up wireless settings (e.g., Bluetooth, Wi-Fi, etc.), sharing business cards, or sharing inormation between NFC-enabled phones.

SUMMARY

NFC standard based RFID tags are being widely deployed, for example, in connection with Digital Out of Home marketing advertising. Additionally, the reading capability of NFC Data Encryption Format (NDEF) based tags are being added to a plethora of mobile devices such as phones and tablets.

A useful feature provided by the combination of these technologies, especially when a tag contains an NDEF record containing a URL, is that there need for application installation on the reading device (e.g., the phone). Simply by tapping the tag against the reading device (or placing the tag near enough to the reading device that the two devices are within an acceptable read range of one another), a browser on the reading device opens and the user is directed to the URL written to memory of the tag.

Often tag platforms and other authorized entities allow the identification of a specific tag via a unique URL or URL part that is stored in tag memory. As a non-limiting example, a URL may take the form of the following:

URL="www.tagplatform.com/UNIQUE_TAG_ID" or
URL="www.tagplatform.com/AXWE45DWA"

This format allows a server to serve (e.g., provide to the reading device) content specific to that tag which has been read by the reading device. It should be appreciated that the tag does not need to be affixed to a specific physical location but could also be added to portable objects such as stickers or the technology could be added to an existing credential such as a smart card (e.g., an HID SEOS card that is compatible to run HID SEOS technology alongside a Type 4 NFC tag on the same chip).

One drawback of appending the UNIQUE_TAG_ID to the URL transmitted by the tag is that the URL is more or less freely readable by anyone. This fact in combination with the fact that a tag may have a substantially unique URL enables anyone to track the tag, not just the intended reading platform or tag provider. Specifically, in certain solutions, there may be a strict requirement to preserve the privacy of the card holder and by adding the NFC NDEF capability described above (that would allow frictionless tapping of the card against a mobile device to open the URL), privacy for the card holder may be compromised. Specifically, such a reading of the card would effectively break the privacy of the card by exactly introducing a card unique freely readable identifier in the form of the UNIQUQ_TAG_ID.

Accordingly, embodiments of the present disclosure propose a mechanism to overcome this drawback by making the tag uniquely identifiable to a specific party (e.g. the tag platform or some other authorized entity) but making it privacy enabled or pseudo random to any other parties without breaking the NFC NDEF standard and the fact that the tag triggers the opening of the browser. A number of different approaches can be used to achieve this unique identification for a specific party while also maintaining the desired privacy for the tag as to other parties.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Furthermore, with reference to FIGS. 1-8, various embodiments of the present disclosure will be described in connection with certain system components having a particular functionality. It should be appreciated, however, that the elements which support a particular functionality may be distributed among more than one system component without departing from the scope of the present disclosure. For instance, functionality described in connection with a reading device may be possessed by an authorized entity, content servers, or the like. Similarly, an authorized entity may possess functionality described in connection with a content server. In other words, embodiments of the present disclosure should not be narrowly construed according to the illustrative embodiments described herein.

Figure 1:
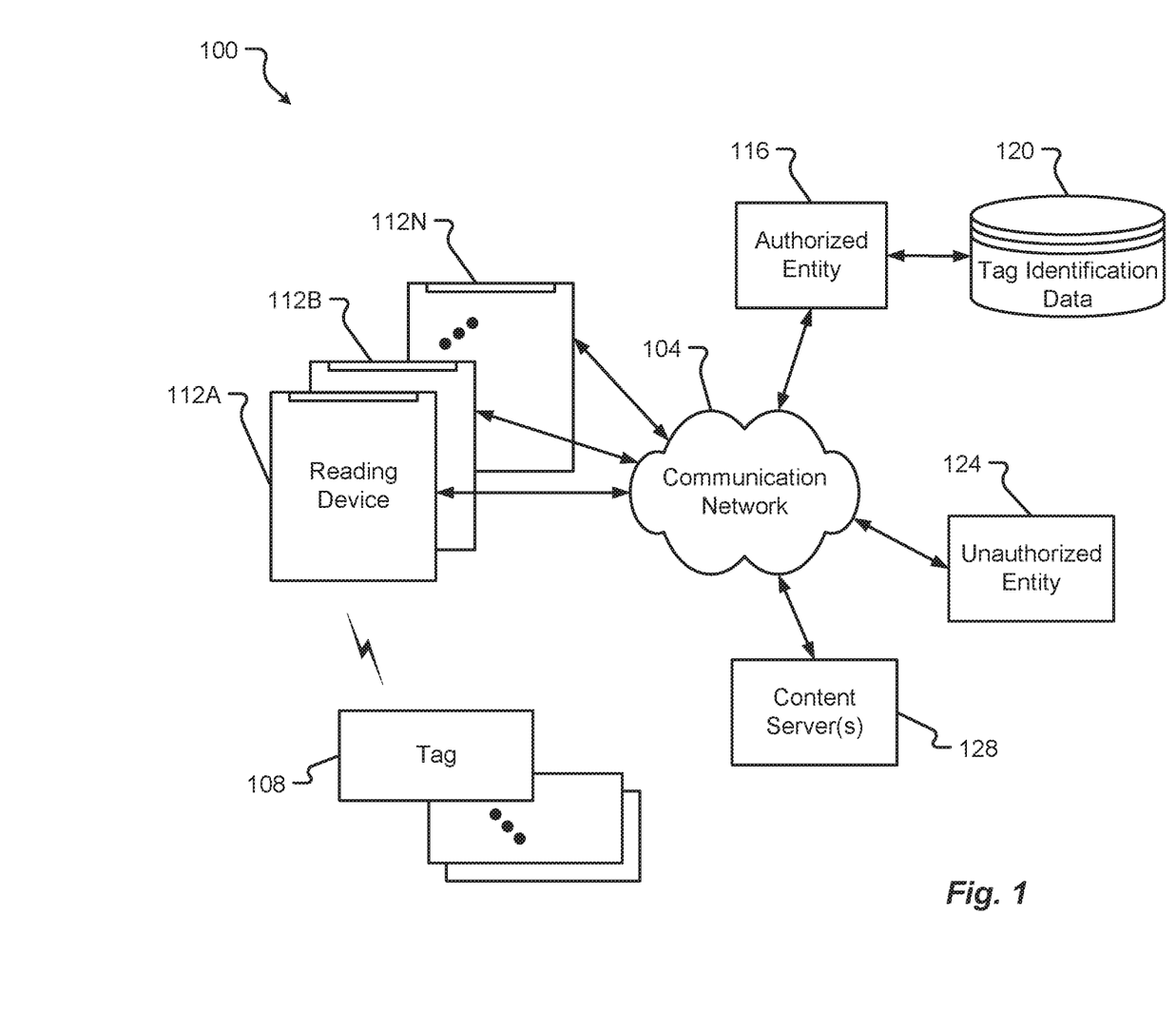
FIG. 1 is a block diagram depicting a transaction system in accordance with embodiments of the present disclosure.

Referring initially to FIG. 1, a transaction system 100 is depicted in accordance with embodiments of the present disclosure. The transaction system 100 is shown to include a communication network 104, one or more tags 108, one or more reading devices 112A-N, an authorized entity 116, an unauthorized entity 124, and one or more content servers 128. In some embodiments, the authorized entity 116, or servers operated by such an entity, may be in communication with a tag identification database 120 and/or have capabilities that enable the authorized entity 116 to not only authorize or authenticate tags 108 based on data exchanged between the tag 108 and reading device 112A-N, but also uniquely identify and/or track tags from among other tags (e.g., via physical tracking and/or knowing locations of reading devices 112A-N). The unauthorized entity 124, on the other hand, may not be provided with the same capabilities as the authorized entity 116 and, therefore, may not be capable of uniquely identifying the tags 108 and/or physically tracking the tags 108. Thus, the tags 108 may be thought of as privacy preserving tags 108 in that the tags do not expose unique identifications to unauthorized entities and/or do not enable themselves to be tracked by unauthorized entities 124.

In some embodiments, the communication network 104 may correspond to one or many networks, of one or many types. Examples of a suitable communication network 104 include, without limitation, a standard Plain Old Telephone System (POTS), an Integrated Services Digital Network (ISDN), the Public Switched Telephone Network (PSTN), a Local Area Network (LAN) (e.g., a Bluetooth network, a WiFi network that utilizes 802.11N protocols, a Zig-Bee network), etc.), a Wide Area Network (WAN), a cellular network (e.g., a GSM, CDMA, LTE, or similar type of network), an RS-232 network, or any other type of network capable of facilitating communications between a reading device 112A-N and other devices like the authorized entity 116 and/or content servers 128.

The reading devices 112A-N may also be configured to read tag data from one or more tags 108 in a population of tags. The tags 108 may correspond to portable (e.g., moveable and/or conveyable by a person) or non-portable (e.g., fixed or secured to a predetermined location or to a predetermined object) devices that are capable of storing data thereon in computer memory (e.g., non-volatile memory such as flash memory or the like), having data written thereto, etc. Examples of form factors that may be used for the tag 108 include, without limitation, portable credentials (e.g., plastic cards or key fobs having an antenna, memory, and IC chip), BLE beacons, stickers, implantable devices, wearable devices, or the like. The tag 108 may take form as a mobile communication device, such as a smartphone or the like.

The tags 108 may communicate with reading devices 112A-N using proximity-based communication protocols. In particular, the reading devices 112A-N and tags 108 may communicate at any number of carrier frequencies such as 125 kHz, 13.56 MHz, 2.4 GHz-2.4835 GHz, or any other frequency channels available for communication. In some embodiments, a reading device 112 and tag 108 may utilizing proximity-based communication protocols that rely upon the devices being within a particular range of one another (e.g., a "read range") to facilitate communications therebetween. Non-limiting examples of the protocols that may be used by the devices include Near-Field Communications (NFC), Bluetooth, Bluetooth Low Energy (BLE), ZigBee, WiFi (e.g., IEEE 802.11N), combinations thereof, and the like. Thus, when the tag 108 is brought within a read range of the reading device 112, an appropriate protocol may be followed that enables the reading device 112 to read data (e.g., tag data) from memory of the tag 108. Thus, to the extent that a wireless communication protocol is employed, both the reading device 112 and tag 108 may be equipped with one or more antennas that facilitate wireless communications and the tag 108 may further include a processor that enables the tag 108 to respond to a request for tag data emitted by the reading device 112. The response prepared by the tag 108 may depend upon an authentication step occurring between the reading device 112 and tag 108, for example.

The reading device 112, in some embodiments, may correspond to a portable tag reader, possibly in the form of a mobile communication device. More specifically, but without limitation, the reading device 112 may correspond to a smartphone, Personal Digital Assistant (PDA), wearable device, a dedicated reading device, and the like. Alternatively, the reading device 112 may correspond to a stationary device that is mounted in a fixed location. One example of a fixed reading device includes a door-mounted reader. The reading device 112 may be provided with capabilities of wirelessly communicating with tags 108 as well as communicating with other entities over the communication network 104. As such, the reading device 112 may comprise drivers that facilitate the tag 108 communications and different drivers that facilitate communications over the communication network 104.

The authorized entity 116 may correspond to an entity that operates one or more servers capable of and permitted to exchange communications with reading devices 112A-N. Particularly, the server(s) operated by the authorized entity 116 may comprise network interfaces that facilitate communications over the communication network 104 as well as processors and memory that enable functionality of the authorized entity 116. The server(s) of the authorized entity 116 may also comprise a database interface that enables the authorized entity 116 to store information into a tag identification database 120 and to retrieve data from the tag identification database 120. The database 120 may be in the form of a hierarchical database, a non-hierarchical database, a SQL database, a No-SQL database, a graph database, or the like.

As compared to the unauthorized entity 124, the server(s) of the authorized entity 116 may be enabled to uniquely identify tags 108 based on tag information received at a reading device 112 and provided to the authorized entity 116. The server(s) of the authorized entity 116 may also be enabled to track a location of movable tags 108 based on the information received at the reading device 112 whereas the unauthorized entity 124 may not have such capabilities. In some embodiments, these capabilities of the authorized entity 116 may be facilitated by the authorized entity 116 having secrets or particular data (e.g., encryption keys, encryption algorithms, decryption keys, decryption protocols, shared secrets, mutual authentication rules, etc.) that the unauthorized entity 124 does not have. These secrets known to the authorized entity 116 may enable server(s) of the authorized entity 116 to uniquely identify and track locations of tags 108. The unauthorized entity 124 may not, however, have such capabilities due to the lack of access to the secrets or particular data. As such, the tags 108 may be referred to as privacy preserving tags 108 that store and communicate data to the reader 112 in such a way that only the authorized entity 116 is able to make full use of the data stored on the tag 108.

The content server(s) 128 may correspond to one or more servers that are referenced to provide content to a reading device 112 based on information communicated to the reading device 112 from a tag 108. For instance, the tag 108 may be enabled to communicate a Universal Resource Locator (URL) or similar link to content available via the content server(s) 128. This URL may be provided to the reading device 112 by the tag 108 in the clear (e.g., in a non-encrypted format) or in an encrypted format. The reading device 112 may input the URL directly into a browser thereof to try and obtain/request the content at the content server 128 referenced by the URL. In other embodiments, the reading device 112 may first provide the URL (and potentially other data) to the authorized entity 116 to have the authorized entity 116 certify an authenticity or format of the URL (e.g., to provide an asserted level of trust for the content server 128) back to the reading device 112. Upon receiving the certification from the authorized entity 116, then reading device 112 may then direct its browser to the URL, thereby enabling the reading device 112 to obtain the content from the content server 128.

Figure 2:
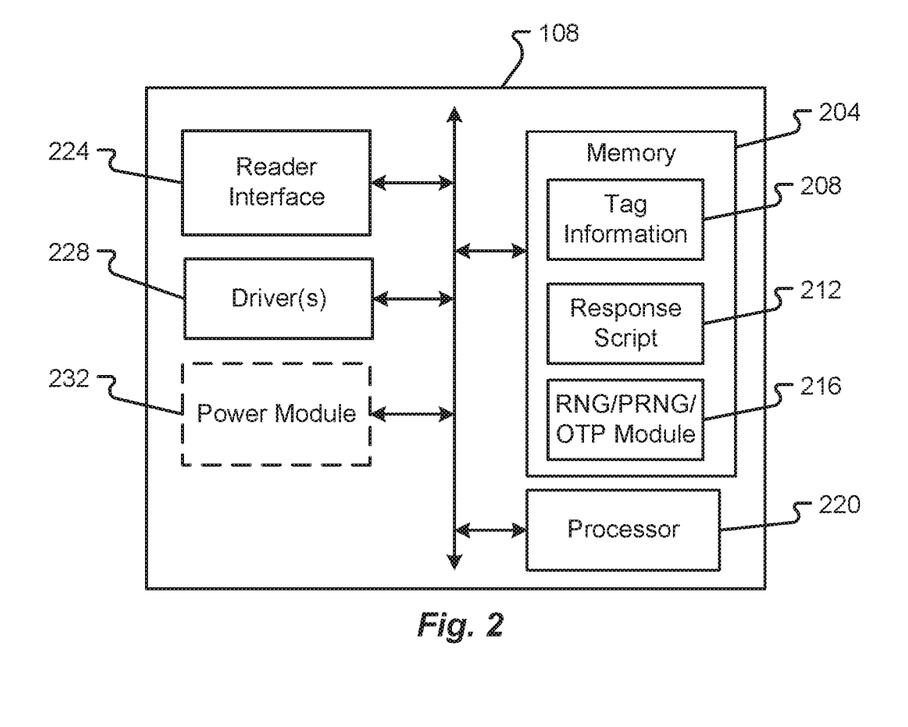
FIG. 2 is a block diagram depicting components of a tag in accordance with embodiments of the present disclosure.

With reference now to FIG. 2, additional details of a privacy preserving tag 108 will be described in accordance with embodiments of the present disclosure. The tag 108 is shown to include memory 204, a processor 220, a reader interface 224, one or more drivers 228, and an optional power module 232. The memory 204 may be configured to store tag information or tag data 208, a response script 212, and a randomizing or OTP module 216.

The memory 204, in some embodiments, may correspond to any type of computer memory capable of storing information in a computer-readable format. The memory 204 may include volatile or non-volatile memory devices. More specific examples of memory 204 include, without limitation, RAM, DRAM, SRAM, A-RAM, Z-RAM, ROM, EEPROM, flash memory, hard disk drives, optical disks, combinations thereof, and the like. The memory 204 is shown to store both tag information 208 and various other routines or scripts 212, 216 that are executable by the processor 220. It should be appreciated, however, that different types of memory devices may be used to store the tag information 208 as compared to the routines or scripts 212, 216.

The tag information 208, in some embodiments, may correspond to data that is written to the memory 204 of the tag 108 and is subsequently readable by a reading device 112A-N. The tag information 208 may be organized or maintained in such a way that certain parts of the tag information 208 are provided to some reading devices 112 whereas other parts of the tag information 208 are provided to other reading devices 112. The tag information 208 may be stored as bits or bytes of data in memory 204 and may potentially be encrypted in memory 204. Thus, the tag information 208 may be stored in an encrypted or non-encrypted format without departing from the scope of the present disclosure.

The response script 212 may correspond to a script or set of processor-executable instructions that enable the processor 220 to respond to read requests issued by a reading device 112 and received at the tag 108. In some embodiments, the response script 212 may define a response protocol that is followed by the tag 108 when a read request is received from a reading device 112. For instance, the response script 212 may include instructions that enable the tag 108 to authenticate with a reading device and to enable the reading device to authenticate the tag 108. The response script 212 may alternatively or additionally include instructions that enable the processor 220 to generate a response to a read request that includes some or all of the tag information 208 stored in memory 204. The response script 212 may further include instructions that enable the transmission of a generated response to the reading device 112 via the reader interface 224. Furthermore, the response script 212 may include a call function that calls or invokes the randomizing or OTP module 216.

The randomizing or OTP module 216 may also be in the form of executable instructions stored in memory 204. Alternatively or additionally, the randomizing or OTP module 216 may include a digital circuit or similar collection of digital circuit elements that are connected to a clock or the like that enables the circuit to generate random numbers, pseudo-random numbers, and/or one-time-passwords that can be used by the response script 212 as part of generating a response to a read request. As a non-limiting example, the randomizing or OTP module 216 may be configured, when invoked by the response script 212, to output a random or pseudo-random number that is passed back to the response script 212. The response script 212 may utilize the random or pseudo-random number received from the randomizing or OTP module 216 to obfuscate, hide, or otherwise conceal some portion of tag information 208 prior to transmitting the tag information 208 via the reader interface 224. This may facilitate the tag 108 to maintain certain portions of its tag information 208 privately (e.g., to not disclose such information to an unauthorized entity 124).

The processor 220 may correspond to any type of device or collection of devices that facilitate the operation and functionality of the tag 108. Suitable examples of a processor 220 include, without limitation, a microprocessor, an Integrated Circuit (IC) chip, a collection of microprocessors, a collection of IC chips, a CPU, an Application Specific Integrated Circuit (ASIC), or the like. The processor 220 may also include internal memory or registers that facilitate operation of the processor 220.

The reader interface 224 may provide the transponder 108 with the ability to communicate with a reading device 112. The reader interface 224 may facilitate machine-to-machine communications with the reader 112 using any type of known or yet to be developed communication protocol. The reader interface 224 may facilitate contact-based communications (e.g., via magstripe, contact chip card, etc.). Alternatively or additionally, the reader interface 224 may facilitate contactless communications (e.g., via RF signals, optical signals, magnetic induction, capacitive coupling, acoustic waves, or the like). Even more specifically, the reader interface 224 may comprise one or more antennas that are inductively tuned to communicate at a particular frequency or within a particular frequency band with a corresponding antenna in a reading device 112. Such an antenna may be configured to transmit signals in accordance with instructions received from the processor 220 and/or from an appropriate interface driver 228. In some embodiments, the reader interface 224 may enable the tag 108 to communicate using NFC, BLE, or some other wireless communication protocol.

The driver(s) 228, as the name suggests, may provide specific instructions or circuitry that enable operation of specific tag components. For instance, a driver 228 may be provided for the reader interface 224. In some embodiments, such an interface driver 228 may be configured to receive a desired response message from the processor 220 and appropriately condition the reader interface 224 to transmit a signal that is indicative of the response message received from the processor 220. For instance, the interface driver 228 may be configured to modulate, encode, encrypt, or otherwise format signals that are transmittable via the interface 224. Other types of drivers 228 may be provided for other components in the tag 108 (e.g., for the power module 232, the memory 204, or the like). Although depicted as separate from the processor 220, it should also be appreciated that the driver(s) 228 may be incorporated into functionality of the processor 220 (or vice versa).

The power module 232 is shown as an optional component of the tag 108. In some embodiments, the tag 108 may comprise an internal power source (e.g., battery, solar cells, etc.) that enable the tag 108 to operate in the absence of external power. In other embodiments, the tag 108 may rely on inductive coupling from an RF field generated by a reading device 112 to power the components of the tag 108. In other words, the tag 108 may correspond to a so-called passive device that does not include an internal power source, but which becomes operational when it is positioned within an RF field produced by a reading device 112. The RF field may inductively provide sufficient power for the tag 108 to receive a read request from the reading device 112, generate an appropriate response, and transmit the response back to the reading device 112.

Figure 3:
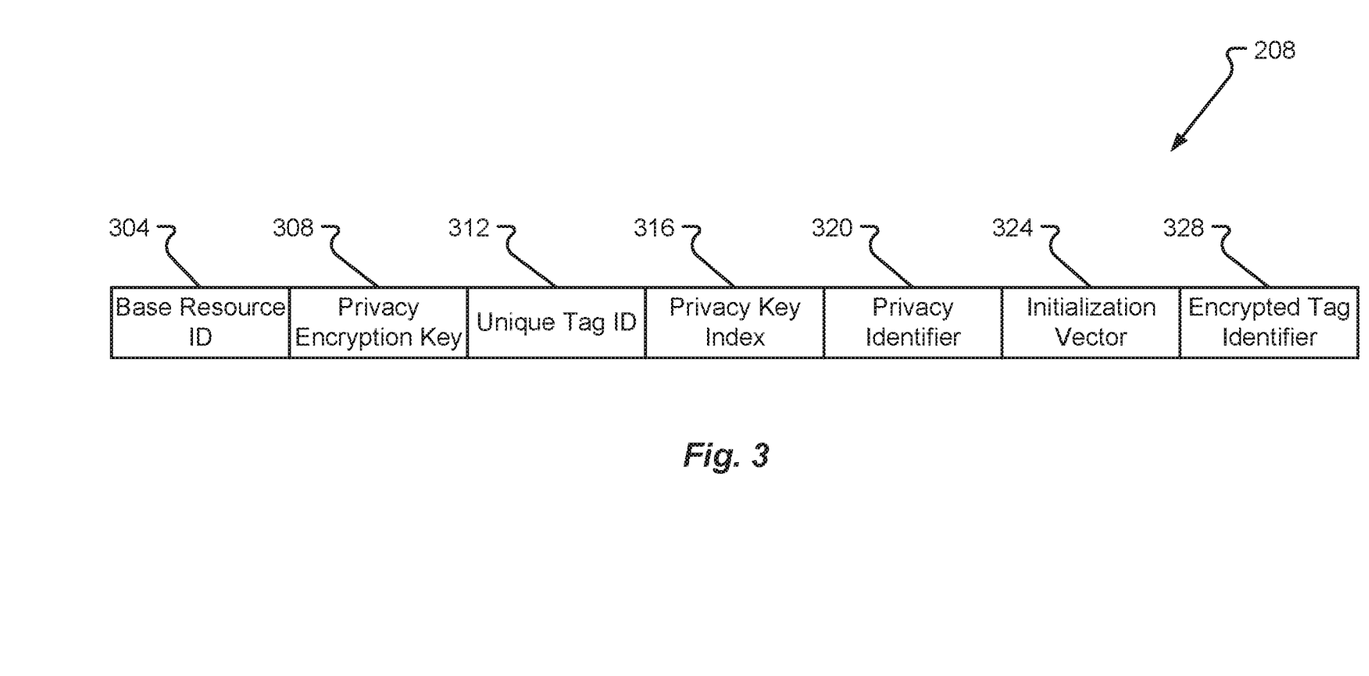
FIG. 3 is a diagram depicting a data structure in accordance with embodiments of the present disclosure.

With reference now to FIG. 3, additional details of a data structure that may be used to store some or all of the tag information 208 will be described in accordance with at least some embodiments of the present disclosure. The data structure is shown to comprise a number of data fields that are separated from one another. It should be appreciated that the data fields depicted in FIG. 3 are for illustrative purposes and should not be construed as limiting the embodiments disclosed herein. The tag information 208 may include a greater or lesser number of fields than depicted and certain fields of information may be combined without departing from the scope of the present disclosure.

The illustrative fields are shown to include a base resource identifier (ID) field 304, a privacy encryption key field 308, a unique tag ID field 312, a privacy key index field 316, a privacy identifier field 320, an initialization vector field 324, and an encrypted tag identifier field 328. Illustratively, the base resource ID field 304 may contain information that describes an address or location of content that is referenced by the tag information 208. As an example, a base resource ID may include a URL or a portion of a URL that can be used to direct a browser to a web server hosted by an authorized entity 116 and/or by a content server 128. The base resource ID field 304 may contain a simple URL or the base resource ID field 304 may contain a base resource ID that is a combination of other tag information 208. For instance, as a non-limiting example, a base resource ID stored in the base resource ID field 304 may include a base URL combined or concatenated with a privacy identifier 320 to form a larger URL.

The privacy encryption key field 308 may be used to store one or more encryption keys that are used to encrypt tag information 208 as it is stored in memory 204. Alternatively or additionally, the privacy encryption key field 308 may store one or more encryption keys that are used to encrypt data prior to transmitting such data via the reader interface 224. The privacy encryption key stored in the field 308 may correspond to a private key from a symmetric key pair, a private key from an asymmetric key pair, and/or a public key from an asymmetric key pair.

The unique tag ID field 312 may be used to store information that uniquely identifies the tag 108 from among other tags in a population of tags. The unique tag ID field 312 may be used to store the entire tag ID or a portion thereof. In some embodiments, the tag ID may uniquely and globally identify the tag 108 from among all other tags in a fixed tag population. In some embodiments, the tag ID may not be specifically unique to a particular tag 108, but rather may be used to identify a plurality of tags in a tag population (e.g., via a site code, manufacturer code, etc.).

The privacy key index field 316 may store information, bits, or a counter value. The privacy key index stored in the index field 316 may be used to help identify a particular privacy encryption key from among a plurality of privacy encryption keys that was used to encrypt a message. The multiple privacy encryption keys may be stored in field 308 and the privacy key index 316 may be used to select which from the multiple keys is used to encrypt a message. Alternatively or additionally, the privacy key index 316 may simply provide an identifier to the authorized entity 116 to assist the authorized entity 116 in determining which among multiple encryption keys was used by the tag 108 to encrypt its response. Thus, the tag 108 may simply store a single privacy encryption key in field 308 where the authorized entity 116 may have access to multiple keys that are identifiable by a privacy key index 316.

The privacy ID field 320 may be configured to store a privacy identifier or similar information that is used to support and maintain privacy characteristics of the tag 108. In some embodiments, a privacy identifier may correspond to a number that is determined with a combination of the privacy encryption key, the unique tag ID, and the privacy key index. The privacy identifier 320 may also support the personalization of a user portal or user experience at a remote system such as the authorize entity 116 and/or a content server 128. Thus, the privacy identifier 320 may correspond to a value that is concatenated or combined with the base resource ID (e.g., a base URL) to generate a customized or personalized URL. This customized or personalized URL can also be used by an authorized entity 116 to help track movement of the tag 108 in a physical access control system or throughout some other physical space.

The initialization vector field 324 may be used to store one or more values that are used as initialization vectors. An initialization vector may be determined, at least in part, based on a value generated by the randomization or OTP module 216. More specifically, the initialization vector may be determined, at least in part, by a random number, a pseudo-random number, or an OTP generated by the module 216.

An encrypted tag identifier 328 may then be calculated or generated by encrypting the unique tag ID 312 with the privacy encryption key 308 and the initialization vector 324. As can be appreciated, the nature of the initialization vector 324 may depend upon the nature of the randomization or OTP module 216. Thus, the value of the encrypted tag identifier stored in field 328 (and the method for decrypting the same) may depend upon the initialization vector 324, which is dependent on the module 216.

Figure 4:
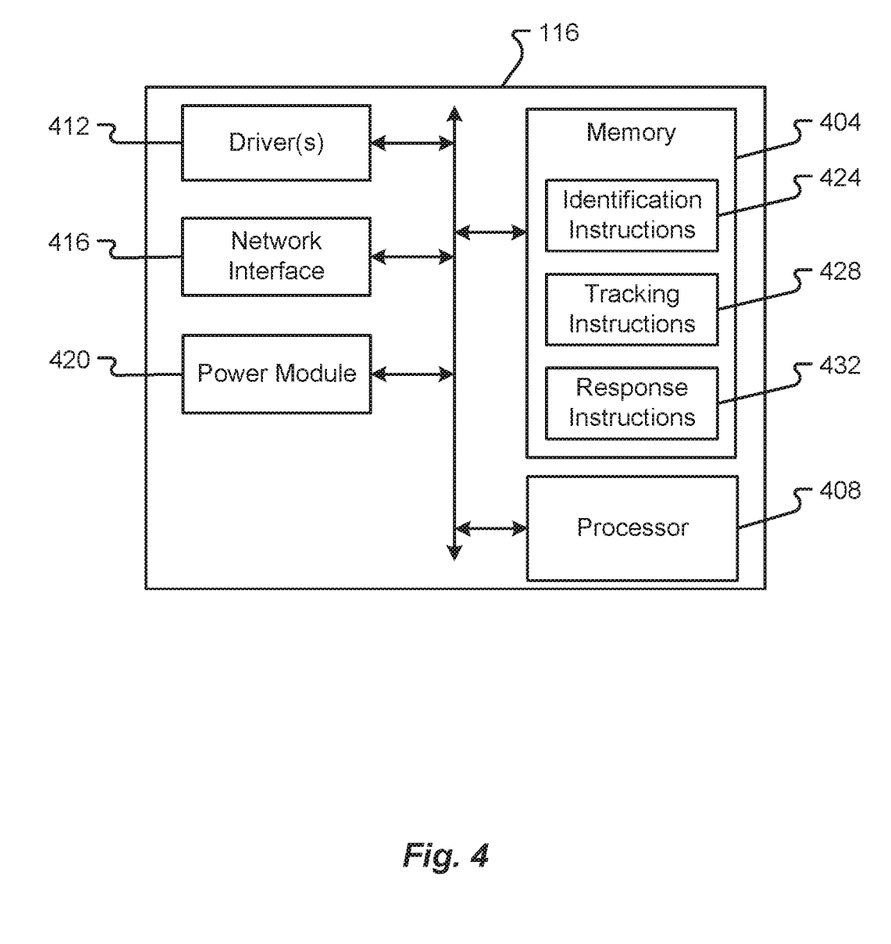
FIG. 4 is a block diagram depicting details of a server operated by an authorized entity in accordance with embodiments of the present disclosure.

With reference now to FIG. 4, additional details of a server operated by an authorized entity 116 will be described in accordance with at least some embodiments of the present disclosure. The server or servers of the authorized entity 116 may be configured to identify a tag 108 or a holder of a tag based on a response provided from the tag 108 to a reading device 112, even if such a response contains encrypted or obfuscated information. The server depicted in FIG. 4 is illustrative of potential components that may be included in a collection of servers operated by the authorized entity 116 and the elements of the depicted server do not necessarily need to reside within a common server housing or blade.

Illustratively, the server of the authorized entity 116 may include memory 404, a processor 408, one or more drivers 412, a network interface 416, and a power module 420. The memory 404 may be similar or identical in nature to the memory 204 of the tag 108, except larger in scale and/or capacity. In some embodiments, the memory 404 include a plurality of memory devices, which may or may not be co-located with the other components of the server. For instance, memory 404 may include RAID memory, virtual memory, or some other external database that stores information made available to the server. In some embodiments, the memory 404 may correspond to local memory that is either volatile or non-volatile in nature.

The memory 404 is shown to include a number of different instruction sets or routines that are executable by processor 408. The instruction sets or routines may include, without limitation, tag identification instructions 424, tracking instructions 428, and response instructions 432. The tag identification instructions 424 may correspond to instructions that enable the server to parse and analyze tag information received from a reading device 112 and identify a tag based thereon. If implemented by an authorized entity 116, the identification instructions 424 may enable the server to uniquely identify a tag 108 from among a plurality of tags 108.

Similarly, the memory 404 may include tracking instructions 428 that enable the server to track a tag 108 and its physical movement. The tracking instructions 428 may include, without limitation, instructions that enable the server to track a physical location of a tag 108 based on information provided to reading devices 112 and/or known locations of reading devices 112. The tracking instructions 428, in some embodiments, may be configured to enable the server of the authorized entity 116 to track location(s) and/or movements of the tag 108 relative to physical assets and/or around a physical premises.

The response instructions 432 may enable the server(s) of the authorized entity 116 to generate one or more responses to a reading device 112 based on tag information provided from the reading device 112 to the server. In particular, an authorized entity 116 may be enabled to certify that a tag 108 provided a trusted and/or properly signed response to the reading device 112. Such a certification may also include instructions for the reading device 112 to navigate its browser or the like to a particular content server 128. Moreover, the response generated by the authorized entity 116 may enable the reading device 112 to have a heightened level of trust with a tag 108 as compared to if the certification was not provided by the authorized entity 116.

The processor 408 may be similar or identical to the processor 220, but again possibly on a larger scale. In particular, the processor 408 may include an IC chip, a microprocessor, a CPU, or the like that enables the authorized entity 116 to execute various instructions stored in memory 404 and to facilitate the functionality of the authorized entity 116.

The driver(s) 412 may correspond to firmware, software, and/or hardware (e.g., logic circuits, digital circuits, analog circuits) components that enable operation of specific server components. For instance, particular hardware components of the server may have dedicated drivers associated therewith that enable operation of the component. As a particular example, a network interface 416 may have a driver 412 associated therewith that enables the network interface 416 to exchange communications over the communication network 104 (e.g., an IP-based network). The driver(s) 412 and their functionality may depend upon the types of components included in the server of the authorized entity 116.

The power module 420 may correspond to an integrated power source that provides electrical power to components of the server. For instance, the power module 420 may include a battery or set of batteries. Alternatively or additionally, the power module 420 may include a power converter that converts energy received from an external power source (e.g., a 120V power outlet) to DC power that is usable by various components of the server.

Figure 5:
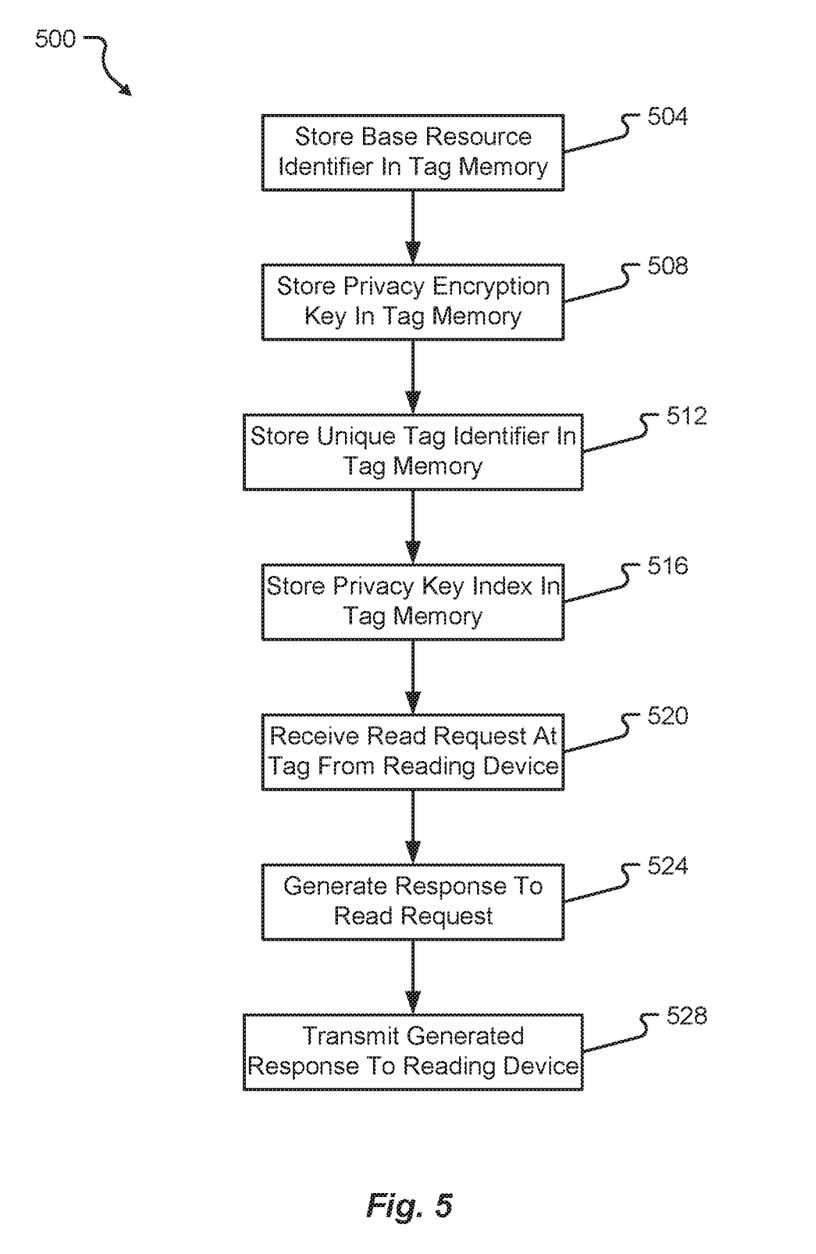
FIG. 5 is a flow diagram depicting a method of operating a tag in accordance with embodiments of the present disclosure.

With reference now to FIG. 5, an illustrative method 500 of operating a tag 108 will be described in accordance with at least some embodiments of the present disclosure. The method 500 begins with a tag 108 storing a base resource ID in its memory 204 as part of tag information 208 (step 504). The method 500 may further include storing a privacy encryption key in memory 204 (step 508), storing a unique tag identifier in memory 204 (step 512), and a privacy key index in memory 204 (step 516).

In some embodiments, the base resource identifier, privacy encryption key, unique tag identifier, and privacy key index may be stored as part of tag information 208 in the memory 208. The various parts of this tag information 208 may be written to the tag 108 during manufacture of the tag 108 and/or during a personalization process. For instance, a writing device having capabilities similar to the reading device 112 may be used to write data to the memory 208 via transmission of wireless signals to the tag 108. The data may be written in alpha numeric format, hexadecimal format, binary format, or some other format without departing from the scope of the present disclosure. The privacy encryption key may not be used to encrypt all of the data stored in memory 204. For instance, the privacy encryption key may be used to encrypt the tag identifier but not the base resource identifier. Likewise, the privacy key index may be stored in an unencrypted state.

The method 500 may continue with the tag 108 coming into a communication distance of a reading device 112. When this occurs, the tag 108 and reading device 112 may begin an authentication process after which the reading device 112 may issue a read request to the tag 108 (step 520). The read request may have a predetermined format and may request particular tag information 208 from the tag 108. In other embodiments, the read request may be a generic read request (e.g., "please send me any data you have available") that does not request specific data from the tag 108.

Upon receiving the read request, the tag 108 may generate a response using its processor 220 and various scripts stored in memory 204. The tag 108 may also utilize the randomizing or OTP module 216 (which may or may not be in the form of computer-readable instructions, but could also be in the form of a circuit) when generating a response to the read request (step 524). In some embodiments, the response generated by the tag 108 may not expose certain tag information 208, but rather may have various parts of the tag information 208 encrypted or otherwise secured via encryption, obfuscation, or the like. Thus, privacy of the tag 108 may be preserved with respect to the unauthorized entity 124, but the tag's 108 identity and/or location may be exposed to an authorized entity 116. The specific way in which the tag 108 achieves this end goal may vary depending upon the nature of the tag 108, the type of encryption key used, the nature of the randomizing or OTP module 216, and other factors.

In one embodiment, the tag 108 may generate a response that utilizes the base resource identifier in the form of a URL, the privacy encryption key, a random or pseudo-random number generated by the randomization or OTP module 216, the unique tag identifier, and the privacy key index. The privacy key index may correspond to a single byte of data in case multiple batches of tags reference different privacy encryption keys. In generating the response, the tag 108 may generate a random or pseudo-random number and use that value as an initialization vector. In some embodiments, this initialization vector (IV) may be used for initializing a particular encryption algorithm, such as AES128. The tag then encrypts the unique tag identifier using the privacy encryption key and the initialization vector. This encrypted unique tag identifier can then be used to create privacy identifying data (DATA PID). In some embodiments DATA PID corresponds to a binary concatenation of the privacy key index, the initialization vector, and the encrypted unique tag identifier. The tag 108 then creates a URL inside buffer memory to return to the reading device 112 using the DATA PID and the base resource identifier. In some embodiments, the URL returned to the reading device 112 comprises a concatenation of the base resource identifier with the DATA PID. Since both the initialization vector and the encrypted unique tag identifier change pseudo-randomly on every read of the tag 108, the tag will produce a different final URL for each reading device 112, which effectively makes it difficult or impossible for the unauthorized entity 124 to distinguish or track the tag 108.

In another embodiment, the tag 108 may generate a response that utilizes the base resource identifier in the form of a URL, the privacy encryption key, a one-time password generated by the randomization or OTP module 216 (e.g., using an HMAC-based OTP as described in IETF RFC 4226, the entire disclosure of which is hereby incorporated herein by reference), the unique tag identifier, and the privacy key index. The privacy key index may correspond to a single byte of data in case multiple batches of tags reference different privacy encryption keys. In generating the response, the tag 108 may generate a one-time password using a one-time password key and a counter C. This value may also be used as the initialization vector (IV) to be used for initializing a particular encryption algorithm, such as AES128. The tag then encrypts the unique tag identifier using the privacy encryption key and the initialization vector. This encrypted unique tag identifier can then be used to create privacy identifying data (DATA PID). In some embodiments DATA PID corresponds to a binary concatenation of the privacy key index, the initialization vector, and the encrypted unique tag identifier. The tag 108 then creates a URL inside buffer memory to return to the reading device 112 using the DATA PID and the base resource identifier. In some embodiments, the URL returned to the reading device 112 comprises a concatenation of the base resource identifier with the DATA PID. Since both the initialization vector and the encrypted unique tag identifier change pseudo-randomly on every read of the tag 108, the tag will produce a different final URL for each reading device 112, which effectively makes it difficult or impossible for the unauthorized entity 124 to distinguish or track the tag 108.

In yet another embodiment, the tag 108 may generate a response that utilizes the base resource identifier in the form of a URL, the privacy encryption key, a symmetric privacy MAC key (PRIV_MAC), the unique tag identifier, and the privacy key index. The privacy key index may correspond to a single byte of data in case multiple batches of tags reference different privacy encryption keys. In generating the response, the tag 108 may let the initialization vector (IV) be the initial vector of a CBC mode of a block cipher used, having the same length as the block size of the cipher. In some embodiments, the IV may be calculated by:

(1) letting RND.IV be a random number generated by the tag 108, which has a size equal to half of the underlying cipher block (half of IV); and (2) letting MAC_IV be a CMAC over RND.IV, using the static privacy MAC key (PRIV_MAC). The CMAC value can be truncated to the same size as RND.IV (e.g., taking the leftmost bits)

This choice of the synthesized value of IV optionally allows the implementation of a fast validation of the response before processing the rest of the data, so that the remote system (e.g., authorized entity 116) can reject any TAG_IDs with non-matching PRIV_MAC keys using a single block cipher operation. Then, the following may be followed:

(1) allow len=block size of block cipher to be used for privacy, authentication
(2) RND.IV=new random number of len/2 bits
(3) MAC_IV=CMAC [PRIV_MAC](RN.JV)
(4) IV=RND.IV concatenated with MAC_IV [0:len/2]

The response cryptogram may then have a fixed length (if the same algorithm is used such as AES 128), so that there cannot be any privacy violation due to the potential different lengths of TAG_ID. The data inside the cryptogram is in BER-TLV encoding, with the TAG_ID using tag 'CF.' The plan data can then be padded with random values up to the fixed length of 48 bytes. The cryptogram is also encrypted in CBC without any padding. Then the TAG_ID can be the unique tag identifier and the length of the tag identifier (e.g., TAG_ID_L) in bytes. This means that S can be the concatenation of the information to be protected in BER-TLV, padded with random data to exactly a fixed number of bytes (e.g., 48 bytes). Then the encrypted unique tag identifier can be computed using a cryptogram calculated by encrypting S under the privacy encryption key in CBC mode using the explicit IV. As shown below, the following may be followed:
(1) S='CF'||TAG_ID_L||TAG_ID||random_padding (where || is a concatenation operation)
(2) encrypted unique identifier may be idEnc=ENC_CBC [PRIV_ENC, IV](S)
(3) Data=privacy key index||IV||idEnc
(4) M=CMAC[PRIV_MAC](Data)
(5) DATA PID=Data||'8E 08'||M[0:64]

As shown above, the DATA PID corresponds to a binary concatenation of the data, certain bits of 'M', and padding bits. The tag 108 then creates a URL inside buffer memory to return to the reading device 112 using the DATA PID and the base resource identifier. In some embodiments, the URL returned to the reading device 112 comprises a concatenation of the base resource identifier with the DATA PID. Since both the initialization vector and the encrypted unique tag identifier change pseudo-randomly on every read of the tag 108, the tag will produce a different final URL for each reading device 112, which effectively makes it difficult or impossible for the unauthorized entity 124 to distinguish or track the tag 108.

The method 500 continues with the tag 108 transmitting the generated response to the reading device 112 (step 528). In some embodiments, the response is transmitted via the reader interface 224. As an example, the response may be transmitted wirelessly in a modulated format.

Figure 6:
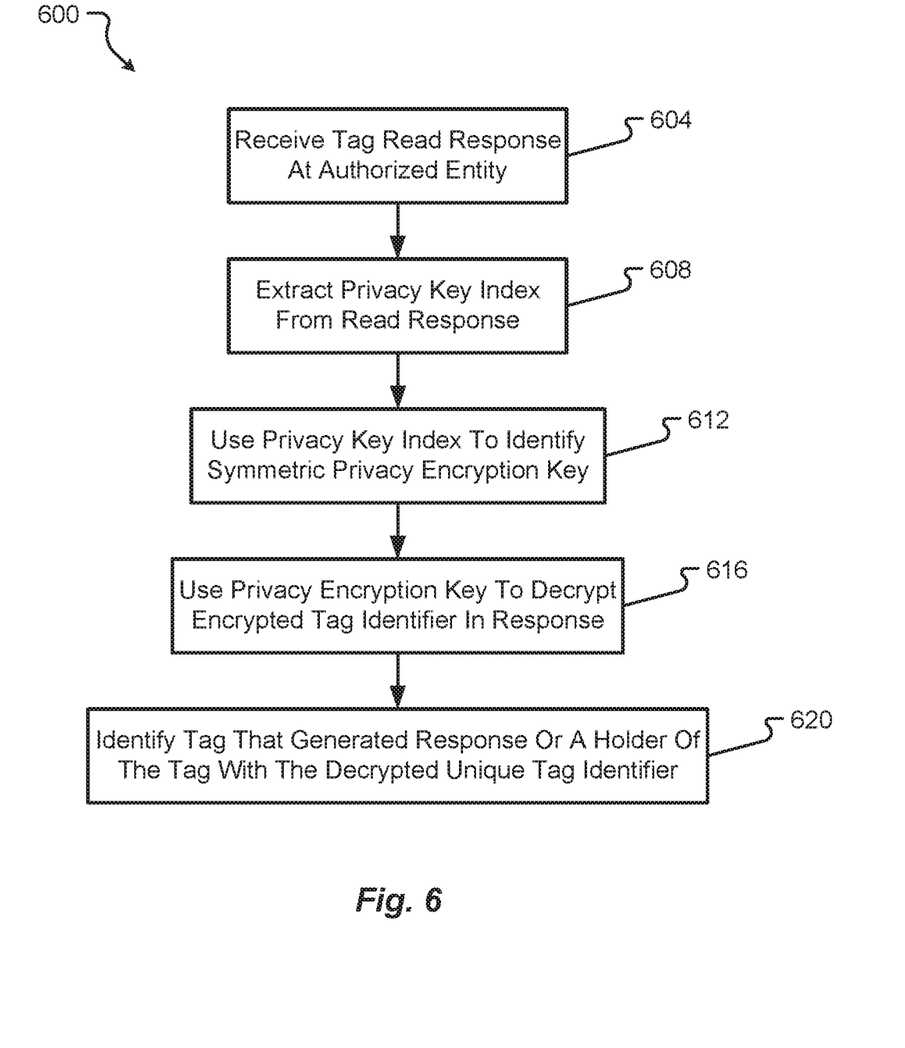
FIG. 6 is a flow diagram depicting a first method of processing tag data in accordance with embodiments of the present disclosure.

With reference now to FIG. 6, a first method 600 of operating a server of an authorized entity 116 will be described in accordance with at least some embodiments of the present disclosure. The method 600 may correspond to a scenario where a random number or pseudo-random number is generated by the tag 108 to help maintain the privacy of tag information 208.

The method 600 begins when a tag read response is received at the server of the authorized entity 116 (step 604). In some embodiments, the response received at the authorized entity 116 is contained in a message transmitted by the reading device 112. More specifically, the reading device 112 may read tag information 208 from the tag 108 and then transmit some or all of that tag information 208 to the authorized entity 116 via the communication network 104. As discussed above, the message(s) transmitted to the authorized entity 116 may be packet-based messages transmitted over a cellular, IP, or other type of communication network. Also as discussed in connection with FIG. 5, the response generated by the tag 108 may include a combination of the base resource identifier as well as a privacy identifier. In some embodiments, the privacy identifier may be determined with the privacy encryption key, the unique tag identifier, and the privacy key index. Moreover, the privacy identifier may support privacy characteristics of the tag 108 while enabling establishment of a personalized portal at a remote system (e.g., the authorized entity 116 or the content server(s) 128).

In this particular example, the privacy identifier may be determined by a combination of the following: (i) the privacy key index; (ii) an initialization vector determined, at least in part, by a random or pseudo-random number generated by the tag; and (iii) an encrypted tag identifier created by encrypting the unique tag identifier with the privacy key and the initialization vector. In such a scenario, the authorized entity 116 may extract the privacy key index from the response (step 608). Thereafter, the authorized entity 116 may utilize the privacy key index to identify a privacy encryption key that can be used for decrypting the encrypted tag identifier contained in the privacy identifier (step 612). The authorized entity 116 may then decrypt the encrypted tag identifier with the symmetric privacy encryption key identifier in step 612 (step 616). Thereafter, the authorized entity 116 may be able to identify the tag or a holder of the tag using the decrypted unique tag identifier (step 620). In some embodiments, the authorized entity 116 may also use the identification information for the tag 108 to track a location of the tag 108.

Figure 7:
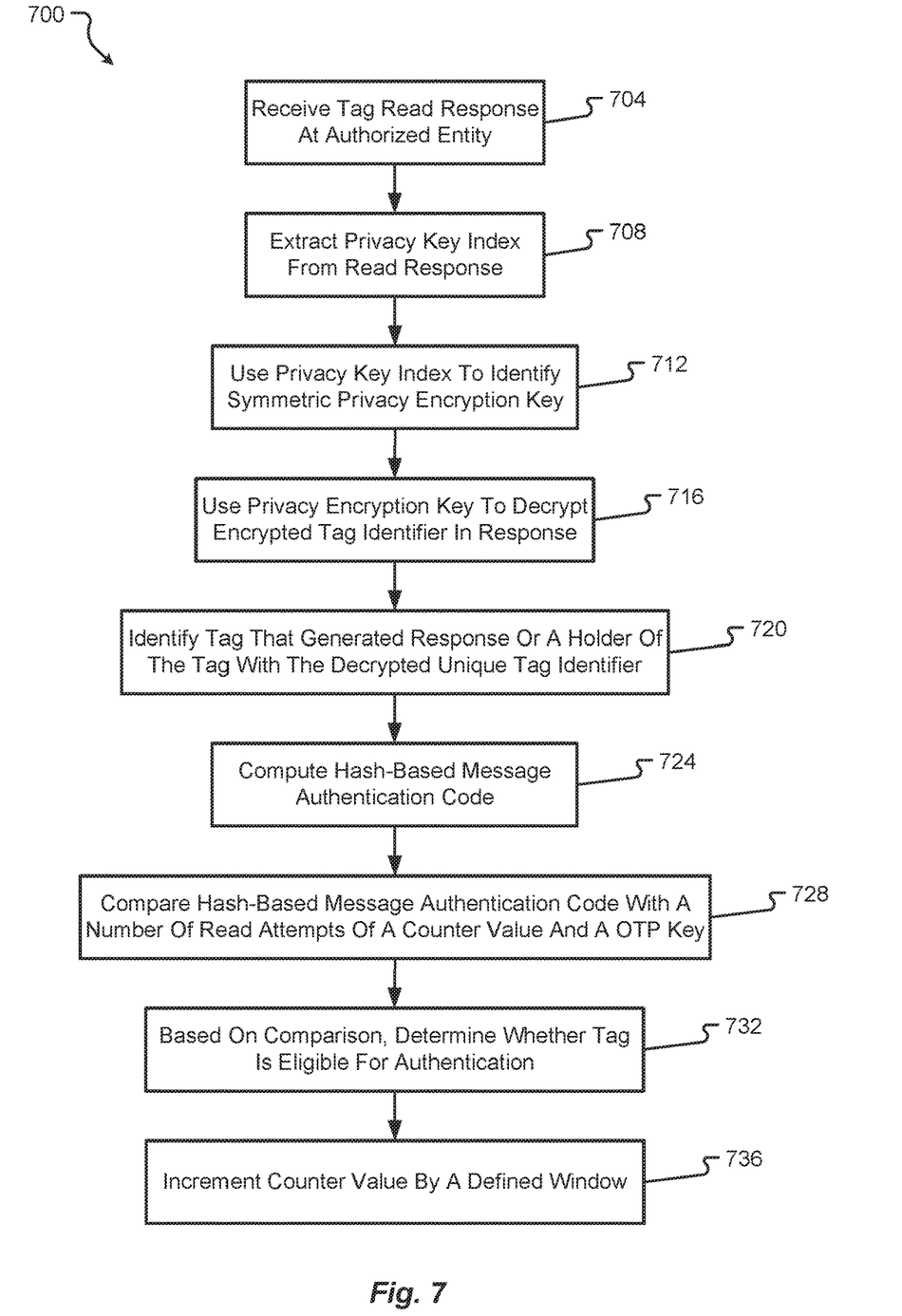
FIG. 7 is a flow diagram depicting a second method of processing tag data in accordance with embodiments of the present disclosure.

With reference now to FIG. 7, a second method 700 of operating a server of an authorized entity 116 will be described in accordance with at least some embodiments of the present disclosure. The method 700 may correspond to a scenario where a OTP is generated by the tag 108 to help maintain the privacy of tag information 208.

The method 700 begins when a tag read response is received at the server of the authorized entity 116 (step 704). In some embodiments, the response received at the authorized entity 116 is contained in a message transmitted by the reading device 112. More specifically, the reading device 112 may read tag information 208 from the tag 108 and then transmit some or all of that tag information 208 to the authorized entity 116 via the communication network 104. As discussed above, the message(s) transmitted to the authorized entity 116 may be packet-based messages transmitted over a cellular, IP, or other type of communication network. Also as discussed in connection with FIG. 5, the response generated by the tag 108 may include a combination of the base resource identifier as well as a privacy identifier. In some embodiments, the privacy identifier may be determined with the privacy encryption key, the unique tag identifier, and the privacy key index. Moreover, the privacy identifier may support privacy characteristics of the tag 108 while enabling establishment of a personalized portal at a remote system (e.g., the authorized entity 116 or the content server(s) 128).

In this particular example, the privacy identifier may be determined by a combination of the following: (i) the privacy key index; (ii); an initialization vector determined, at least in part, by a one-time password generated by the tag; and (iii) an encrypted tag identifier created by encrypting the unique tag identifier with the privacy key and the initialization vector. In such a scenario, the authorized entity 116 may extract the privacy key index from the response (step 708). Thereafter, the authorized entity 116 may utilize the privacy key index to identify a privacy encryption key that can be used for decrypting the encrypted tag identifier contained in the privacy identifier (step 712). The authorized entity 116 may then decrypt the encrypted tag identifier with the symmetric privacy encryption key identifier in step 612 (step 716). Thereafter, the authorized entity 116 may be able to identify the tag or a holder of the tag using the decrypted unique tag identifier (step 720). In some embodiments, the authorized entity 116 may also use the identification information for the tag 108 to track a location of the tag 108.

The method 700 continues with the authorized entity 116 computing a hash-based message authentication code (MAC) (step 724). This step may correspond to an optional step. Then the authorized entity 116 may compare the hash-based MAC with a number of read attempts of a counter value and an OTP key (step 728). This information can then be used to authenticate the tag 108 (step 732). In particular, the tag 108 may be authenticated by the authorized entity 116 by computing the hash-based message authentication code and comparing the hash-based message authentication code against a number of read attempts of a counter value and a one-time password key stored against the unique tag identifier in an internal database. After the comparison, the counter value may be incremented by a defined window (e.g., a procedure known in event-based one-time-password validation using HOTPs) (step 736).

Figure 8:
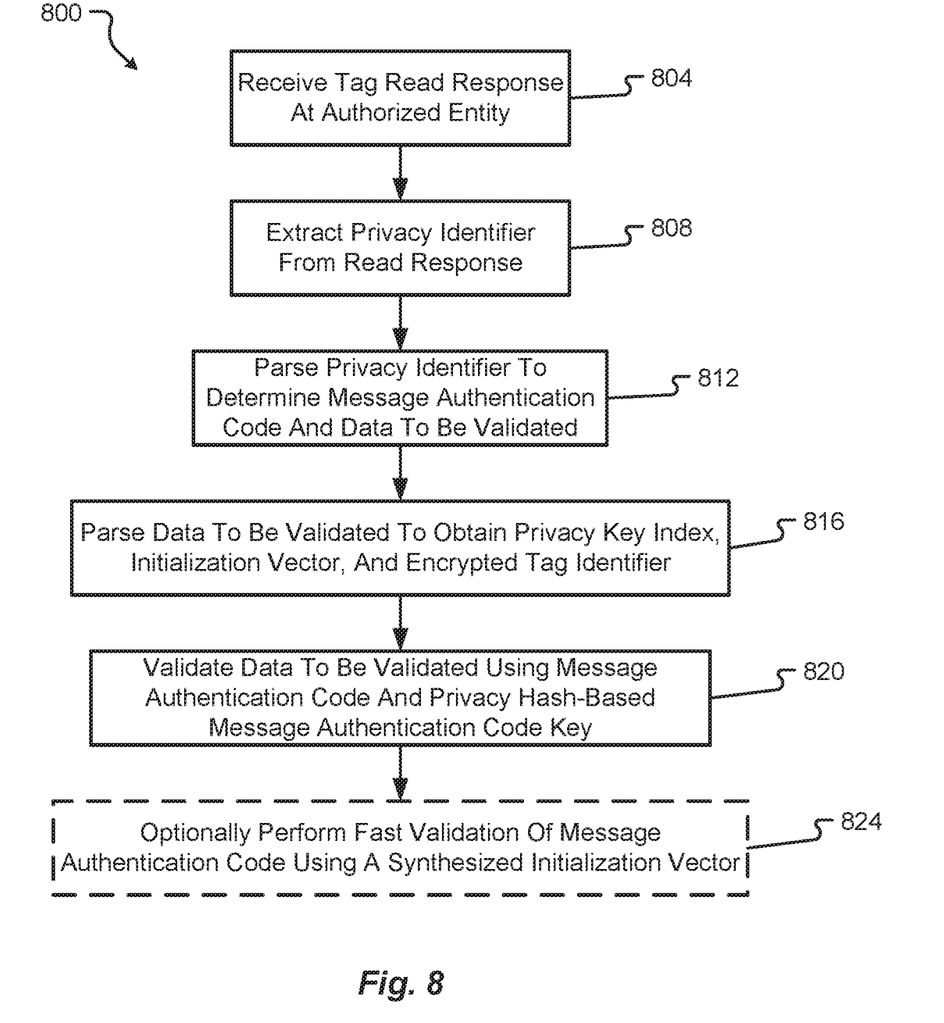
FIG. 8 is a flow diagram depicting a third method of processing tag data in accordance with embodiments of the present disclosure.

With reference now to FIG. 8, a third method 800 of operating a server of an authorized entity 116 will be described in accordance with at least some embodiments of the present disclosure. The method 800 may correspond to a scenario where a privacy algorithm is used by the tag 108 to help maintain the privacy of tag information 208.

The method 800 begins when a tag read response is received at the server of the authorized entity 116 (step 804). In some embodiments, the response received at the authorized entity 116 is contained in a message transmitted by the reading device 112. More specifically, the reading device 112 may read tag information 208 from the tag 108 and then transmit some or all of that tag information 208 to the authorized entity 116 via the communication network 104. As discussed above, the message(s) transmitted to the authorized entity 116 may be packet-based messages transmitted over a cellular, IP, or other type of communication network. Also as discussed in connection with FIG. 5, the response generated by the tag 108 may include a combination of the base resource identifier as well as a privacy identifier. In some embodiments, the privacy identifier may be determined with the privacy encryption key, the unique tag identifier, and the privacy key index. Moreover, the privacy identifier may support privacy characteristics of the tag 108 while enabling establishment of a personalized portal at a remote system (e.g., the authorized entity 116 or the content server(s) 128).

In this particular example, the privacy identifier may be determined by a combination of the following: (i) an initialization vector determined, at least in part, with a randomly or pseudo-randomly generated number, a message authentication code encryption key, and a determination of a block cipher length; (ii) an encrypted tag identifier created by encrypting the unique tag identifier with the privacy key, the initialization vector, and a concatenation of the unique tag identifier with a tag identifier length value and a random padding; and (iii) a message authentication code computed by encrypting the encrypted tag identifier with the privacy key. In such a scenario, the authorized entity 116 may extract the privacy key index from the response (step 808). Thereafter, the authorized entity 116 may parse the privacy identifier to determine a MAC and data to be validated (step 812). The authorized entity 116 may also parse the data to be validated to obtain the privacy key index, the initialization vector, and the encrypted unique tag identifier (step 816). This data may then be validated using the MAC and the privacy hash-based MAC key that is indexed by the privacy key index (step 820). In some embodiments, the authorized entity 116 may also use the identification information for the tag 108 to track a location of the tag 108. The method 800 may also include an optional step of performing a fast validation of the MAC using a synthesized initialization vector (step 824).

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
storing a base resource identifier in memory of a tag;
storing one or more privacy encryption keys in the memory of the tag;
storing a unique tag identifier in the memory of the tag, wherein the unique tag identifier uniquely identifies the tag;
storing a privacy key index in the memory of the tag, the privacy key index identifying a particular privacy encryption key from the one or more privacy encryption keys;
receiving, at the tag, a read request from a reading device;
generating a response to the read request that includes a combination of the base resource identifier as well as a privacy identifier, wherein the privacy identifier is determined with the particular privacy encryption key identified by the privacy key index, the privacy key index, and an encrypted tag identifier created by encrypting the unique tag identifier with the particular privacy encryption key identified by the privacy key index and an initialization vector; and
transmitting the response to the reading device.

2. The method of claim 1, wherein the initialization vector is determined, at least in part, by a random or pseudo-random number generated by the tag.

3. The method of claim 2, further comprising:
receiving the response at an authorized entity;
extracting, at the authorized entity, the privacy key index from the response;
using the extracted privacy key index to identify a symmetric privacy encryption key to use for decrypting the encrypted tag identifier contained in the privacy identifier;
decrypting, at the authorized entity, the encrypted tag identifier with the symmetric privacy encryption key; and
identifying, at the authorized entity, the tag or a holder of the tag with the unique tag identifier.

4. The method of claim 1, wherein the initialization vector is determined, at least in part, by a one-time password generated by the tag.

5. The method of claim 4, further comprising:
receiving the response at an authorized entity;
extracting, at the authorized entity, the privacy key index from the response;
using the extracted privacy key index to identify a symmetric privacy encryption key to use for decrypting the encrypted tag identifier contained in the privacy identifier;
decrypting, at the authorized entity, the encrypted tag identifier with the symmetric privacy encryption key;
identifying, at the authorized entity, the tag or a holder of the tag with the unique tag identifier; and
authenticating the tag by computing a hash-based message authentication code and comparing the hash-based message authentication code against a number of read attempts of a counter value and a one-time password key stored against the unique tag identifier in an internal database; and
incrementing the counter value by a defined window.

6. The method of claim 1, wherein the privacy identifier is determined by a combination of the following: (i) the initialization vector (ii) the encrypted tag identifier; and (iii) a message authentication code computed by encrypting the encrypted tag identifier with a message authentication code encryption key;
wherein the initialization vector is determined, at least in part, with a randomly or pseudo-randomly generated number, the message authentication code encryption key, and a determination of a block cipher length; and
wherein the encrypted tag identifier is created by further encrypting the unique tag identifier with a concatenation of the unique tag identifier with a tag identifier length value and a random padding.

7. The method of claim 6, further comprising:
receiving the response at an authorized entity;
extracting, at the authorized entity, the privacy identifier from the response;
parsing the privacy identifier to determine the message authentication code and data to be validated;
parsing the data to be validated to obtain the privacy key index, the initialization vector, and the encrypted tag identifier; and
validating the data to be validated by using the message authentication code and a symmetric privacy encryption key corresponding to the privacy key index.

8. The method of claim 7, further comprising:
performing a fast validation of the message authentication code by using a synthesized initialization vector.

9. The method of claim 1, wherein the response is in a Universal Resource Locator (URL) format, wherein the base resource identifier is concatenated with the privacy identifier to form the URL, and wherein the URL directs a browser to a web server hosted by an authorized entity.

10. The method of claim 1, wherein the particular privacy encryption key corresponds to a private key from a symmetric key pair.

11. A privacy preserving system, comprising:
at least one privacy preserving tag that includes:
an interface that enables the at least one privacy preserving tag to exchange communications with a reading device;
a processor; and
memory in which a base resource identifier, a privacy encryption key, a unique tag identifier, and a privacy key index are stored, wherein the privacy key index identifies the privacy encryption key, and wherein the memory also comprises instructions that are executable by the processor when the at least one privacy preserving tag is in communication with the reading device via the interface, the instructions, when executed, enabling the processor to generate a response to a read request issued by the reading device that includes a combination of the base resource identifier as well as a privacy identifier, wherein the privacy identifier is determined with the privacy encryption key, the privacy key index, and an encrypted tag identifier created by encrypting the unique tag identifier with the privacy encryption key and an initialization vector.

12. The system of claim 11, wherein the initialization vector is determined, at least in part, by a random or pseudo-random number generated by the tag.

13. The system of claim 12, further comprising an authorized entity enabled to communicate with the reading device and perform the following functions:

receive the response transmitted by the at least one privacy preserving tag to the reading device;

extract the privacy key index from the response;

use the extracted privacy key index to identify a symmetric privacy encryption key to use for decrypting the encrypted tag identifier contained in the privacy identifier;

decrypt the encrypted tag identifier with the symmetric privacy encryption key; and identify the tag or a holder of the tag with the unique tag identifier.

14. The system of claim 11, wherein the initialization vector is determined, at least in part, by a one-time password generated by the tag.

15. The system of claim 14, further comprising an authorized entity enabled to communicate with the reading device and perform the following functions:

receive the response transmitted by the at least one privacy preserving tag to the reading device;

extract the privacy key index from the response;

use the extracted privacy key index to identify a symmetric privacy encryption key to use for decrypting the encrypted tag identifier contained in the privacy identifier;

decrypt the encrypted tag identifier with the symmetric privacy encryption key;

identify the tag or a holder of the tag with the unique tag identifier; and authenticate the tag by computing a hash-based message authentication code and comparing the hash-based message authentication code against a number of read attempts of a counter value and a one-time password key stored against the unique tag identifier in an internal database; and increment the counter value by a defined window.

16. The system of claim 11, wherein the privacy identifier is (ii) the encrypted tag identifier; and (iii) a message authentication code computed by encrypting the encrypted tag identifier with a message authentication code encryption key;

wherein the initialization vector is determined, at least in part, with a randomly or pseudo-randomly generated number, the message authentication code encryption key, and a determination of a block cipher length; and wherein the encrypted tag identifier is created by further encrypting the unique tag identifier with a concatenation of the unique tag identifier with a tag identifier length value and a random padding.

17. The system of claim 16, further comprising an authorized entity enabled to communicate with the reading device and perform the following functions:

receive the response transmitted by the at least one privacy preserving tag to the reading device;

extract the privacy identifier from the response;

parse the privacy identifier to determine the message authentication code and data to be validated;

parse the data to be validated to obtain the privacy key index, the initialization vector, and the encrypted tag identifier; and validate the data to be validated by using the message authentication code and a symmetric privacy encryption key corresponding to the privacy key index.

18. The system of claim 17, wherein the authorized entity is further enabled to perform a fast validation of the message authentication code by using a synthesized initialization vector.

19. The system of claim 11, wherein the response is in a Universal Resource Locator (URL) format, wherein the base resource identifier is concatenated with the privacy identifier to form the URL, and wherein the URL directs a browser to a web server hosted by an authorized entity.

20. A privacy preserving tag, comprising:

an interface that enables communications with a reading device;

a processor; and memory in which a base resource identifier, a privacy encryption key, a unique tag identifier, and a privacy key index are stored, wherein the privacy key index identifies the privacy encryption key, and wherein the memory also comprises instructions that are executable by the processor when the privacy preserving tag is in communication with the reading device via the interface, the instructions, when executed, enabling the processor to generate a response to a read request issued by the reading device that includes a combination of the base resource identifier as well as a privacy identifier, wherein the privacy identifier is determined with the privacy encryption key, the privacy key index, and an encrypted tag identifier created by encrypting the unique tag identifier with the privacy encryption key and an initialization vector.

* * * * *